April 23, 1968  L. BECKER ET AL  3,380,063
AUXILIARY INSTRUMENT FOR THE ANALYSIS OF SPECTRAL PLATES
Filed Nov. 25, 1966  4 Sheets-Sheet 1

United States Patent Office 3,380,063
Patented Apr. 23, 1968

3,380,063
AUXILIARY INSTRUMENT FOR THE ANALYSIS OF SPECTRAL PLATES
Lothar Becker, Frankfurt, Germany, and Hans Werner Drawin, Ville-d'Avray, France, assignors to Commissariat à l'Energie Atomique, Paris, France
Filed Nov. 25, 1966, Ser. No. 597,097
Claims priority, application France, Dec. 16, 1965, 42,647
4 Claims. (Cl. 346—13)

ABSTRACT OF THE DISCLOSURE

Spectral plates are analyzed by an instrument directly connected to a recording microdensitometer, the instrument measuring the blackening of the plate, as a function of its position thereon, as an electric signal. Instrument is an electric curve follower containing the calibration curve prepared with electrically conductive ink. An XY recorder is used receiving a signal corresponding to the movement of the microdensitometer along the spectral plate and supplies a curve of the intensity of the image on the plate.

---

The present invention is concerned with an auxiliary instrument for the analysis of spectral plates.

The blackening S of a photographic plate is a non-linear function of the intensity I of the image produced on the plate. In the case of a given wavelength, a given exposure time, well defined conditions of photographic development and other factors in the central region of the blackening range, we have: $S \sim \log I$; outside of this region, S becomes a highly complex function of I. The non-linear dependence of the blackening curve entails a very laborious procedure in the quantitative analysis of spectral plates.

As is already known, blackening can be automatically transformed into intensity by means of a number of different instruments which are at present in existence, when such instruments are connected to a microdensitometer. Specific reference can be made in this connection to an instrument which is employed for analyzing solar spectra (the Utrecht solar atlas) and another instrument which is based on the same principle but is an improved version providing greater ease of handling, and in which the calibration curve (blackening curve) is utilized as a screen. In accordance with another principle, a comparison spectrum is photographed on the plate at the same time as the principal spectrum. The intensity of the lines of this comparison spectrum is attenuated by virtue of the interposition of an attenuator having known characteristics. By utilizing two microdensitometers (one for the principal spectrum and one for the comparison spectrum), the blackening can be transformed directly into intensity.

An apparatus is also known in which the calibration curve employed is produced electrically by a large number of potentiometers such as eighteen, for example. Finally, if an electronic computer is available, the blackening values supplied by the microdensitometer can be printed on cards or tapes, analysis of the results being performed by the computing machine.

In his work entitled "Physics of the Stellar Atmospheres," Unsöld recommends that drawn blackening curves which are followed by a photoelectric cell should be utilized in an auxiliary instrument coupled to a microdensitometer.

The instrument according to the present invention, which results from researches conducted by Messrs. Lothar Becker and Hans Werner Drawin of the European Atomic Energy Community (Euratom) is also based on the principle which consists in making use of drawn blackening curves in the auxiliary apparatus. However, instead of using a photoelectric cell for the purpose of following these curves, the apparatus according to the invention makes use of an electrical curve follower. As a consequence, the calibration curve must be drawn with an electrically conductive ink. On the other hand, the system employed for following the curve can be of any type desired.

More specifically, the present invention relates to an auxiliary instrument for analyzing spectral plates which is intended to be connected directly to a recording microdensitometer which measures the blackening S of the plate as a function of its position on said plate and therefore as a function of the wavelength $\lambda$ on the plate and gives S as a function of $\lambda$ in the form of an electric signal, said instrument being essentially characterized in that it comprises an electric curve follower containing the calibration curve which is drawn with an electrically conductive ink and the X system of which is connected to the blackening signal S supplied by the microdensitometer whilst the Y system thereof supplies during the displacement of a detector along said curve a signal which represents the blackening values S as values of intensity, and an XY recorder, the Y input of which is connected to said signal and the X input of which is connected to the microdensitometer and receives the signal corresponding to the displacement of said microdensitometer along the spectral plate, said recorder being thus adapted to supply a curve which indicates the intensity I of the image produced on said plate as a function of the displacement of the microdensitometer and consequently of the wavelength.

In accordance with one embodiment of said instrument, the calibration curve is introduced in the curve follower in logarithmic scale and there is obtained in the recorder a curve $\log I = f(\lambda)$.

In accordance with another embodiment, the calibration curve is introduced in the curve follower in linear scale, in which case the recorder provides a curve $I = f(\lambda)$.

In the case last referred-to, there is incorporated in the instrument in accordance with the invention an integrator which makes it possible to obtain the integral $\int I(\lambda) d\lambda$ as a function of the displacement $\Delta\lambda$ of the microdensitometer, said integrator being connected to the intensity signal emitted by the curve follower and being adapted to supply the value of said integral to the input Y of a second XY recorder, the X input of which receives the signal corresponding to the displacement $\Delta\lambda$ of the microdensitometer along the spectral plate.

Further features and advantages of this invention will be brought out by the description which now follows in reference to the accompanying drawings, in which two forms of execution of the instrument in accordance with the invention are given by way of explanation and not in any limiting sense.

In these drawings:

FIG. 3 is a diagram of the integration system, in which:

Figure 4:
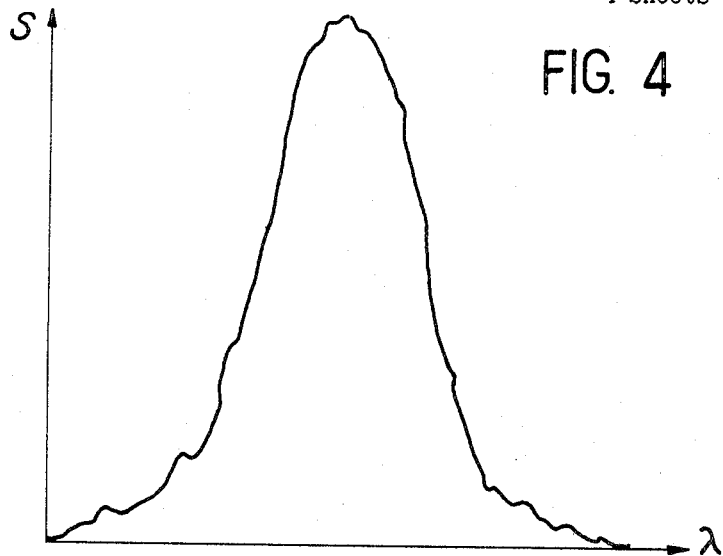

$A$ = current amplifier
$M_1$ = integration motor
$M_R$ = cancelling motor
$T$ = device for initiating the operation of $M_R$
$N$ = supply FIG. 4 represents a densitogram of the Hα line (λ=6563 A.) which is produced by the microdensitometer.

Figure 5:
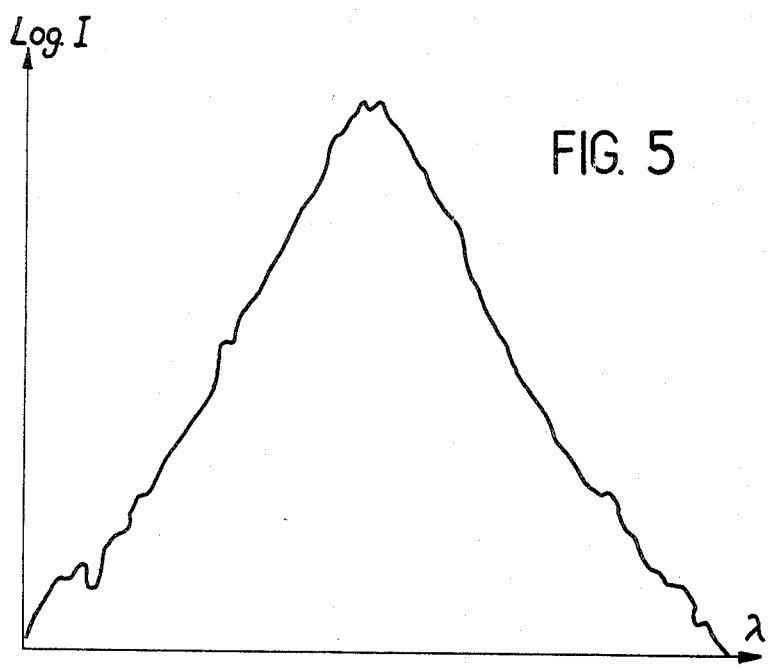
Figure 6:
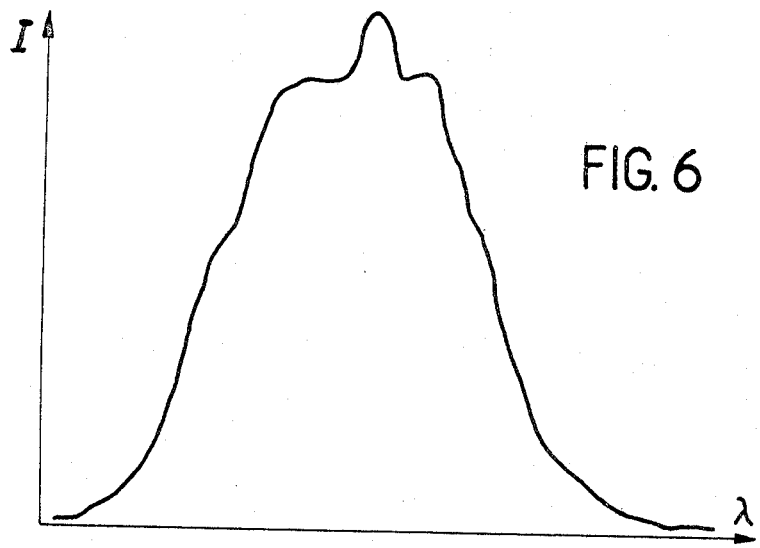
Figure 7:
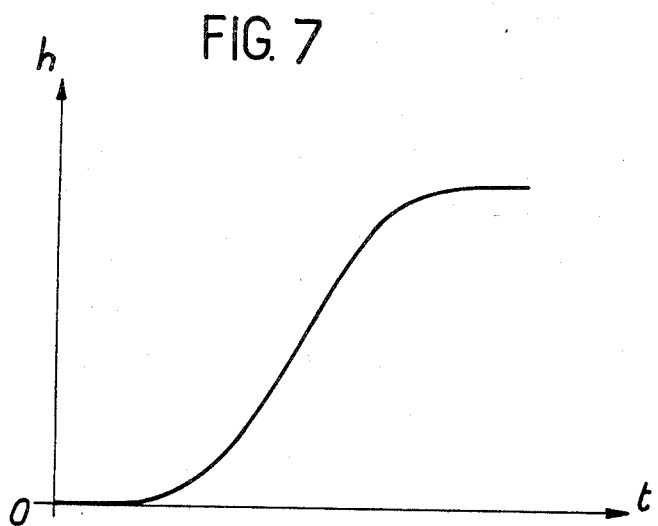

FIGS. 5 and 6 represent the line intensity profiles, respectively in logarithmic scale and in linear scale; and finally, FIG. 7 shows the recording curve after integration on the spectral line of FIG. 6; during integration, the recorder describes the curve which is drawn; the final height $h$ is the value of the integral $\int I(\lambda)d\lambda$ along the entire line.

In designing the instrument, the present applicant has aimed to satisfy the three following conditions:

(1) The recording of the profiles of the spectral lines (or of the continuum) must be possible in logarithmic scale:

$$f = \log I(\lambda)$$

(2) The recording of the profiles of the spectral lines (or of the continuum) must be possible in linear scale:

$$f = I(\lambda)$$

(3) While the instrument gives the profile in linear scale, it must be capable of supplying at the same time the integral $\int I(\lambda)d\lambda$.

The first and second points can readily be satisfied if calibration curves which are drawn in either logarithmic or linear scale are put in the instrument. In order to comply with the third condition, it is necessary to construct an integrator.

The instrument has been designed to be connected to a recording microdensitometer 1. The blackening which is given by the microdensitometer as a function of the wavelength λ is employed for the analysis which follows. It is therefore necessary to ensure that the said blackening appears continuously in the form of an electric signal. To this end, there are incorporated in the microdensitometer two precision potentiometers (not shown), one potentiometer being related to the displacement of the table ($x$-axis) whilst the other potentiometer is related to the displacement of the attenuator ($y$-axis), said potentiometers being connected to a constant-voltage supply.

The attenuator within the microdensitometer moves according to the blackening of the plate; as a rule, this displacement is directly proportional to the blackening. We therefore have the function $S=f\lambda$ as given by the microdensitometer in the form of an electric signal.

Figure 1:
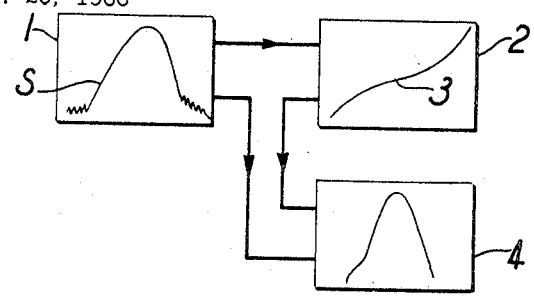
FIG. 1 is a schematic diagram of one form of execution of the instrument which corresponds to the case in which the profile of a line must be recorded in logarithmic scale.

In order to satisfy condition 1 (profile in logarithmic scale) the analysis is carried out in accordance with FIG. 1. The blackening signal S is connected to the X system of a curve follower 2. If the calibration curve 3 in logarithmic scale is introduced in the curve follower, the detector (not shown) follows this curve and produces in the Y system a signal corresponding to the function $I=f(S)$.

Said signal is then connected to the Y input of an XY recorder to which is given the reference 4. Said XY recorder receives at the same time at the X input the signal which corresponds to the displacement of the table. There is therefore obtained in this recorder the function $I=f(\lambda)$.

Figure 2:
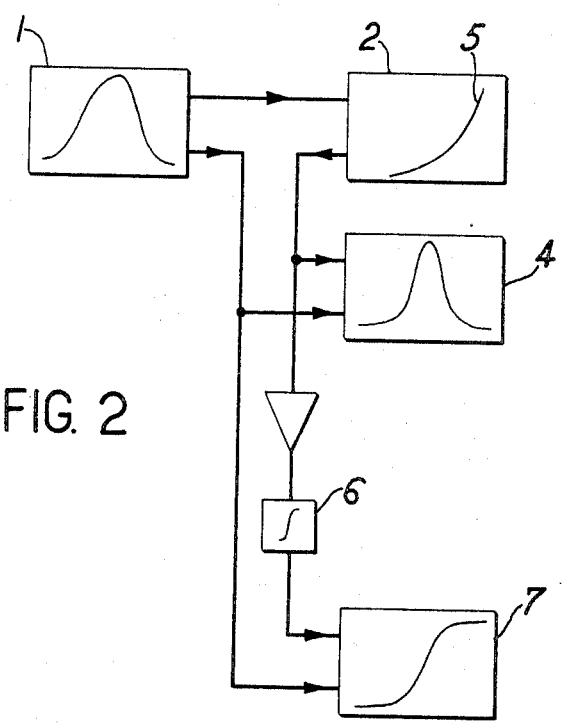
FIG. 2 is a schematic diagram of the instrument in the case in which the profile must be recorded in linear scale, with integration of $\int I(\lambda) d\lambda$ on a second recorder.

In order to fulfill conditions 2 and 3 (profile in logarithmic scale and integration $\int I(\lambda)d\lambda$, the analysis is performed in accordance with FIG. 2. For this purpose, a calibration curve 5 in linear scale is introduced in the curve follower. The XY recorder (reference 4) gives the intensity in linear scale as a function of Δλ, namely the displacement of the table.

In order to obtain the integral, the values of I are introduced into an integrator 6 which gives the intermediate integral $\int I(\lambda)dt$.

If the speed of displacement of the table is constant, we have:

$$dt \sim d\lambda$$

The integrator 6 accordingly gives a value which is proportional to $$\int I(\lambda)d\lambda$$

This value is transmitted to the XY recorder (reference 7) through the Y input. The X input of this recorder receives a signal according to the displacement of the table of the microdensitometer. There is thus obtained the function:

$$\int I(\lambda)d\lambda$$

It should be pointed out that all of these curves log $I(\lambda)$, $I(\lambda)$ and $\int I(\lambda)d\lambda$ can be given in numerical values.

The apparatus in accordance with the invention is constructed as follows:

The curve follower employed is a commercial apparatus. he calibration curve which is drawn with electrically conductive ink on a sheet of paper is followed by a high-frequency detection probe. The two XY recorders are also commercially available instruments.

Figure 3:
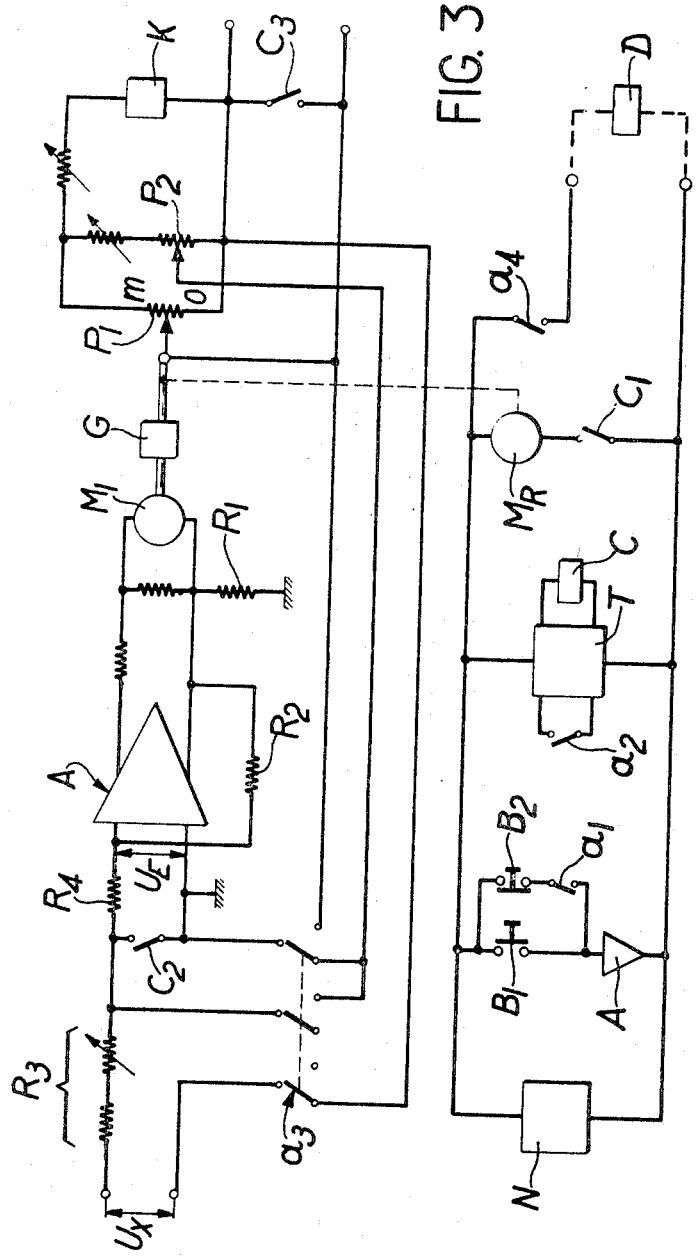

Integration is effected by means of a measurement motor $M_I$, the speed of rotation of which is proportional to the voltage applied (FIG. 3). By means of a gear system G, the motor produces the displacement of the contact of a potentiometer $P_1$ which is connected to a constant-voltage supply K. The voltage between the initial point 0 and the point of contact is proportional to the integral.

Inasmuch as the output of the curve follower is much lower than that of the motor, it is necessary to interpose a current amplifier A between the curve follower and the motor $M_I$. An electromechanical device makes it possible to reset the integrator to zero after an integration (cancelling motor $M_R$).

The integrator unit contains the elements given in FIG. 3.

The amplifier A is a transistorized current amplifier according to the principle of modulation by diodes. Good stability is obtained as a result of high feedback produced by the resistors $R_1$ and $R_2$. The feedback and the value of resistance of the resistor $R_3$ have been so determined that a maximum deflection Y of the curve follower produces a current of 20 ma. through the output resistors of the integrator.

The motor $M_I$ operates at a speed of 240 r.p.m. with a current of 20 ma. The reduction in transmission which is produced by the gear system is 1:127. The utilization of a measurement motor $M_I$ in the integrator has the advantage of reducing the influence of electrical disturbances to a considerable extent by reason of the inertia of the mechanical system, thus avoiding errors of measurement. Furthermore, accurate integration is permitted by virtue of the high responsiveness of the motor which additionally makes it possible to retain the value of the integral over a long period of time.

The return of the contact of $P_1$ to zero after an integration is carried out by means of the cancelling motor $M_R$. By depressing the knob $B_1$, a device T is put into operation by way of $a_2$. T causes the motor $M_R$ to operate for the period of time which is necessary for the contact of $P_1$ to return to zero. Said device T is supplied from the unit N.

During this time, the input of the amplifier, the output of the integrator (contacts $C_2$ and $C_3$) and the inputs of the recorders are short-circuited through the relay D. Short-circuiting of the recorders is maintained until the moment when the knob $B_2$ is depressed (commencement of the integration).

The object of the potentiometer $P_2$ is to permit of integration in the positive direction and in the negative direction if the base of the plate is raised.

The precision of the instrument herein described depends mainly on the constancy of the reference voltage sources and on the linearity of the different measuring potentiometers.

The XY recorders provide a very good linearity (variation of less than 1%). The precision of the curve-following system depends mainly on the shape of the calibration curve and the manner in which it has been drawn; all the measuring potentiometers which are employed in this instrument have a deviation or variation from linearity of less than 0.4%. The reference voltage sources are stabilized in two stages, firstly, by Zener diodes and then by silicon reference elements having a temperature coefficient of $\pm 0.005\%/°C$.

All the other attenuation resistors have high stability and a negligible temperature coefficient. Each reference voltage can be regulated independently of the others.

The instrument has been set so that 1 centimeter of deflection on the microdensitometer table should correspond exactly to 1 centimeter along the X-axis of the XY recorders. Moreover, the maximum blackening deflection on the microdensitometer corresponds to a maximum deflection in the X direction of the curve follower. Consequently, all the factors of transmission from one system to the other remain constant. Possible errors in the electrical portion of the apparatus are less than $\pm 3\%$. The accuracy of the intensity curves depends almost solely on the accuracy of the calibration curves which are introduced in the curve follower.

FIGS. 4 to 7 show the possibilities of the instrument.

FIG. 4 shows a densitogram of the H line ($\lambda = 6563$ A.) which is given by the microdensitometer. This spectral line has been obtained in a pulsed electric discharge in hydrogen. Prior to triggering the discharge, a magnetic field of a few kilogauss was superposed in the axial direction. There are thus obtained spectral lines which are widened by the intermolecular electric field which is present in the plasma (Stark effect) and by the superposed magnetic field (Zeeman effect). A slight widening of the spectral line due to the Zeeman effect may be seen on the spectral plate, but practically no deformation can be observed on the blackening curve which is given by the microdensitometer.

Using the same plate, the present applicant has photographed blackening gradations, which accordingly made it possible to draw the blackening curves in both logarithmic and linear scales.

These curves were introduced in the curve follower and the line intensity profiles in the logarithmic and linear scales which were then obtained are shown in FIGS. 5 and 6. The curve of FIG. 5 is regular whilst the curve of FIG. 6 shows the details in the center of the spectral line: a non-displaced central component and the incipient resolution of two lateral components resulting from the Zeeman effect in the zone of transition from abnormal to normal.

It should be noted that, if the curve S had been processed by ordinary means, it would never have been possible to obtain the details of FIG. 6.

FIG. 7 shows the recording curve after integration on the spectral line which is shown in FIG. 6. The ordinate $h$ of the curve at the end of the recording is directly the integral $\int I(\lambda)d\lambda$ on this line.

The instrument in accordance with the present invention reduces the work entailed in analysis to a very considerable extent, especially when a large number of plates of the same discharge has to be analyzed under the same conditions of exposure and development. Moreover, the instrument makes it possible to obtain results which are much more detailed and accurate than those of known analytical instruments.

What is claimed is:

1. An auxiliary instrument for analyzing spectral plates which is intended to be connected directly to a recording microdensitometer which measures the blackening S of the plate as a function of its position on said plate and therefore as a function of the wavelength $\lambda$ on the plate and gives S as a function of $\lambda$ in the form of an electric signal, wherein said instrument comprises an electric curve follower containing the calibration curve which is drawn with an electrically conductive ink and the X system of which is connected to the blackening signal S supplied by the microdensitometer whilst the Y system thereof supplies during the displacement of a detector along said curve a signal which represents the blackening values S as values of intensity, and an XY recorder, the Y input of which is connected to said signal and the X input of which is connected to the microdensitometer and receives the signal corresponding to the displacement of said microdensitometer along the spectral plate, said recorder being thus adapted to supply a curve which indicates the intensity I of the image produced on said plate as a function of the displacement of the microdensitometer and consequently of the wavelength $\lambda$.

2. An instrument according to claim 1, wherein the calibration curve is introduced in the curve follower in logarithmic scale and there is obtained in the recorder a curve $\log I = f(\lambda)$.

3. An instrument according to claim 1, wherein the calibration curve is introduced in the curve follower in linear scale, in which case the recorder provides a curve $I = f(\lambda)$.

4. An instrument according to claim 1, wherein an integrator is connected to the intensity signal emitted by the curve follower and supplies the value of the integral $\int I(\lambda)d\lambda$ to the Y input of a second XY recorder, the X input of which receives the signal corresponding to the displacement $\Delta\lambda$ of the microdensitometer along the spectral plate.

References Cited

UNITED STATES PATENTS

| 2,834,247 | 5/1958 | Pickels | 346—13 X |
| 2,835,858 | 5/1958 | Moseley | 318—31 |
| 3,141,727 | 7/1964 | Devereaux | 346—29 |

RICHARD B. WILKINSON, *Primary Examiner.*

J. W. HARTARY, *Assistant Examiner.*